United States Patent [19]
Cahill

[11] Patent Number: 5,471,259
[45] Date of Patent: Nov. 28, 1995

[54] CLIP-ON SUNGLASSES ASSEMBLY FOR THE BRIM OF A HAT

[76] Inventor: Robert B. Cahill, 10087 Via Marmol, Escondido, Calif. 92026

[21] Appl. No.: 239,684

[22] Filed: May 9, 1994

[51] Int. Cl.⁶ ................................................ G02C 3/00
[52] U.S. Cl. ......................... 351/155; 351/44; 2/453
[58] Field of Search ............................ 351/155, 158, 351/44, 47, 57; 2/10, 453, 12

[56] References Cited

U.S. PATENT DOCUMENTS

| | | | |
|---|---|---|---|
| 4,819,274 | 4/1989 | Day | 2/10 |
| 5,181,139 | 1/1993 | Benitez | 351/155 |
| 5,208,916 | 5/1993 | Kelman | 351/155 |
| 5,261,124 | 11/1993 | Day | 351/155 |

Primary Examiner—William L. Sikes
Assistant Examiner—Hung Xuan Dang
Attorney, Agent, or Firm—Charles C. Loagan, II

[57] ABSTRACT

A clip-on sunglasses assembly having an elongated base member with a clip member secured to its top for detachably securing the base member to the bottom surface of the brim of a hat. A spring action sled is reciprocally mounted in a rectangularly shaped cutout portion of the base member. A one piece lens has its top edge secured to a lens holder member having a cylindrical shaped drum secured to its rear edge. The cylindrical drum is pivotally mounted in structure extending downwardly from the spring action sled. The lens can be pivoted between a down position and an up position and it is positively positioned in each of these respective positions.

10 Claims, 6 Drawing Sheets

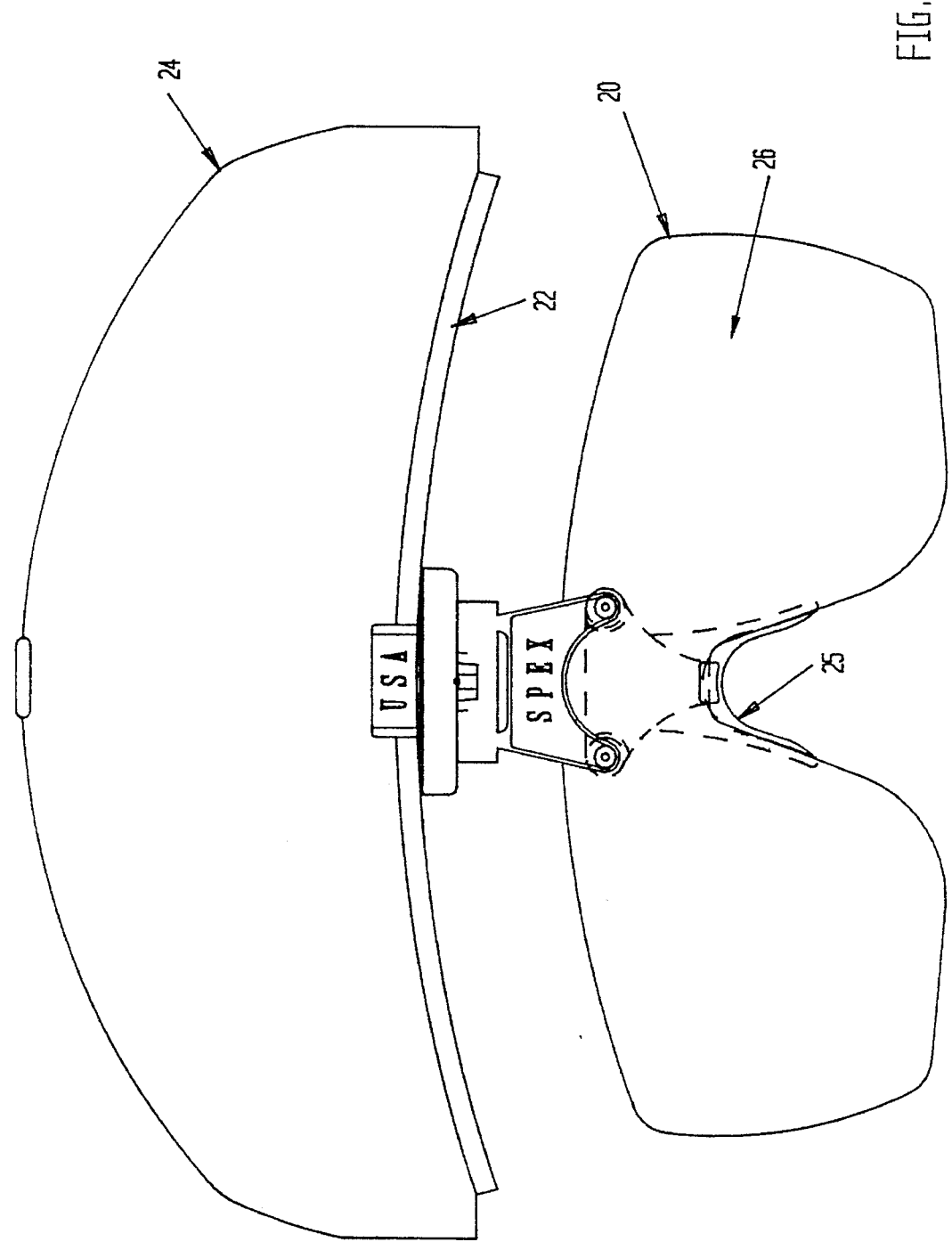

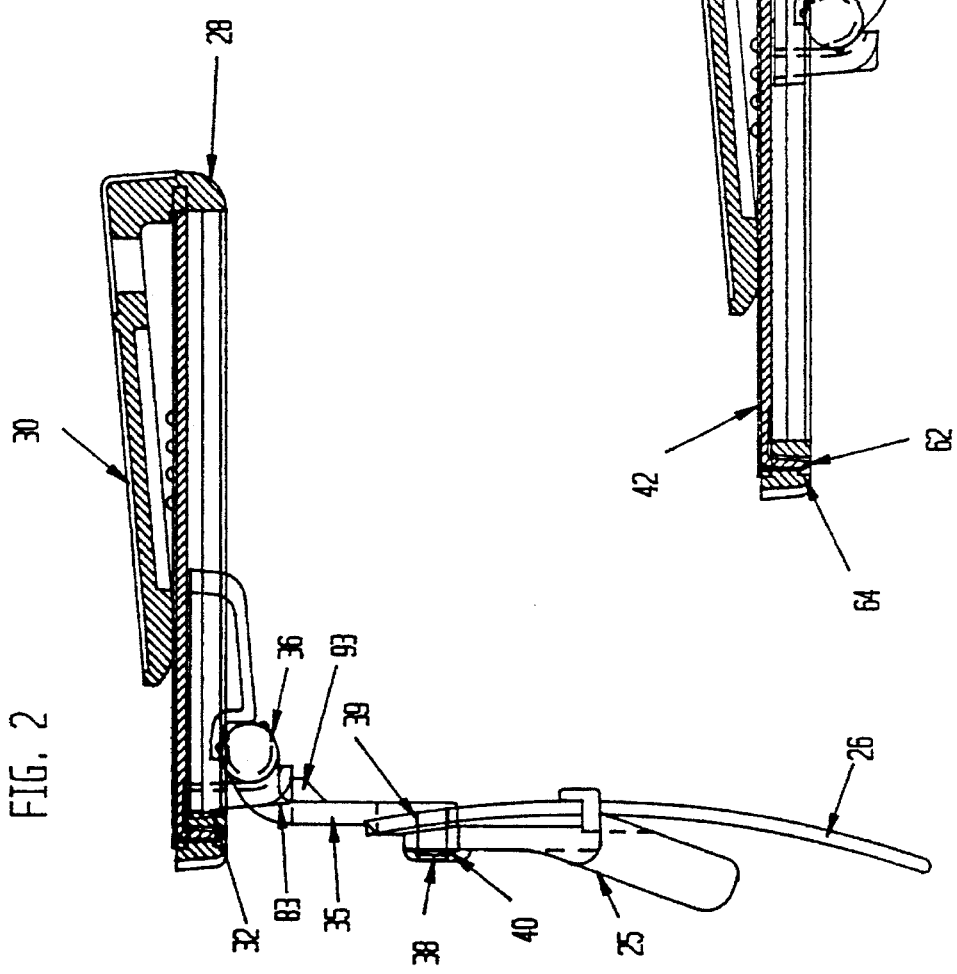

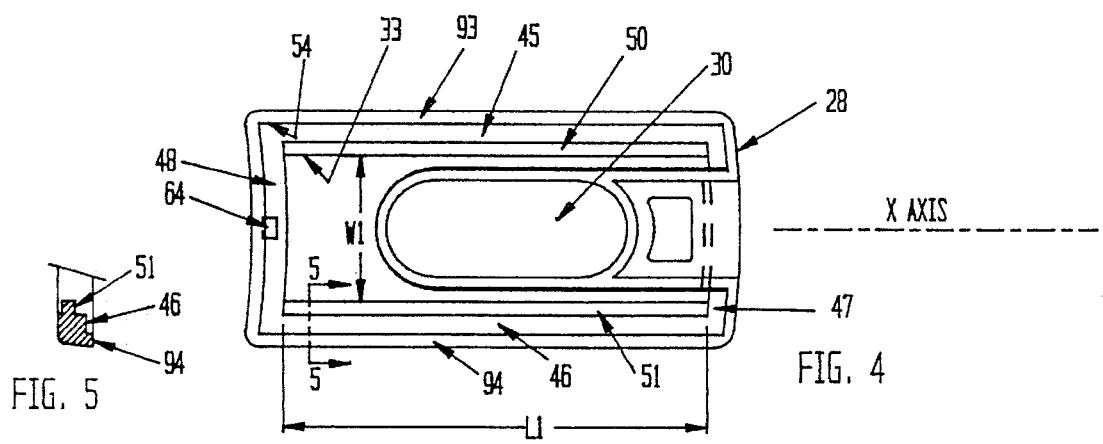
FIG. 5
FIG. 4
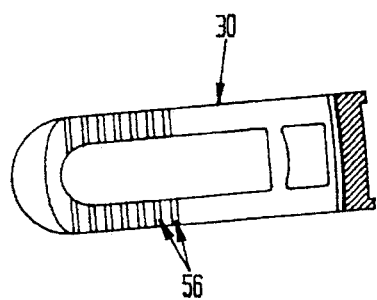
FIG. 6
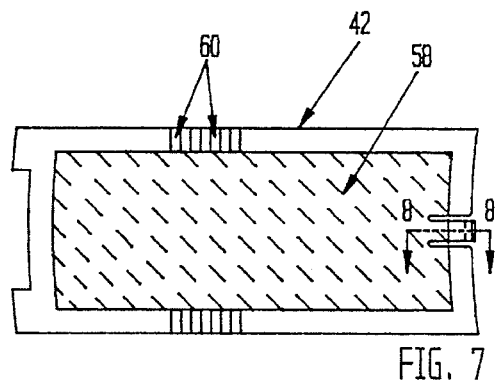
FIG. 7
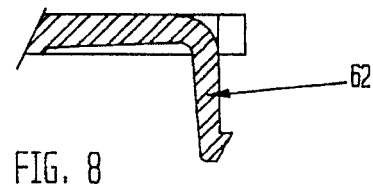
FIG. 8

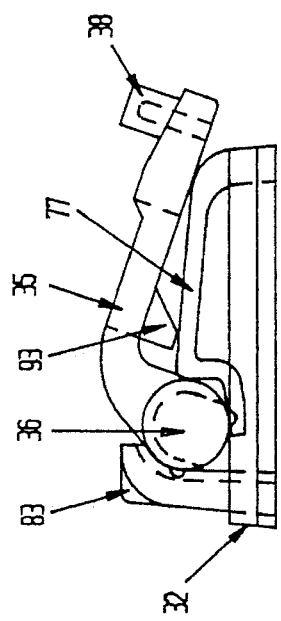
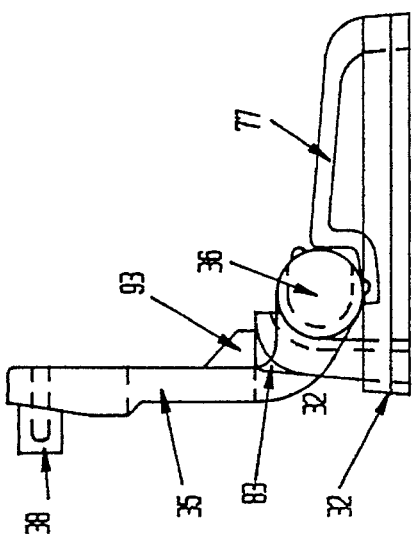
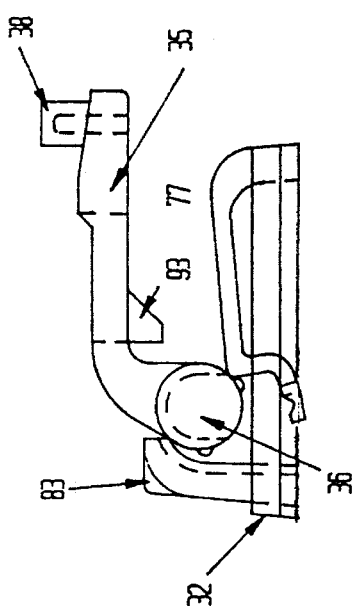
FIG. 14
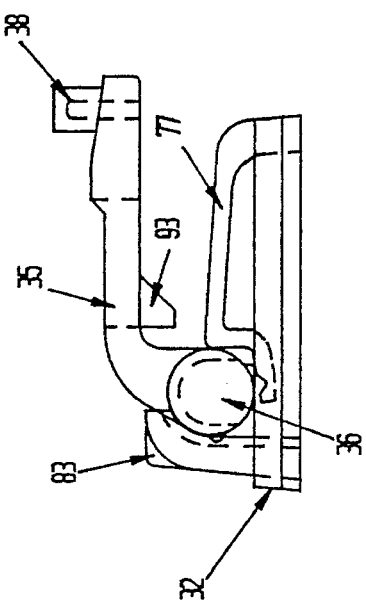
FIG. 16
FIG. 15
FIG. 17

CLIP-ON SUNGLASSES ASSEMBLY FOR THE BRIM OF A HAT

BACKGROUND OF THE INVENTION

The invention relates to sunglasses and more specifically to a clip-on sunglasses assembly that can be removably attached to the brim of a hat.

There are times when a person wearing a pair of sunglasses prefers to have their vision unobscured by the sunglasses. Presently there are two options available to the person. One requires that a person remove the sunglasses and either hold them or place them in their pocket, purse, or other storage area. The second alternative is to have a strap or string connected to the rear end of the temple members of the sunglasses that allows the sunglasses to hang around a person's neck. When a person is frequently changing between having the sunglasses on and off, the existing alternatives are inconvenient.

The Day U.S. Pat. No. 4,819,274 has provided a solution to the problem which allows the sunglasses to be quickly and easily flipped up to a position removed from a person's line of vision or flipped to a position that intercepts their line of vision. A major drawback to Day's structure is the fact that the mounting structure for his mounting block has to be preformed in the bottom surface of the brim of a cap. The sunglasses assembly is not removable so that it can be used with other caps or hats.

It is an object of the invention to provide a novel clip-on sunglasses assembly that can be detachably secured to the brim of a hat or ball cap.

It is also an object of the invention to provide a novel clip-on sunglasses assembly that can be quickly and easily installed or removed.

It is also an object of the invention to provide a novel clip-on sunglasses assembly that can be quickly and easily transferred from the brim of one hat to the brim of another hat.

It is another object of the invention to provide a novel clip-on sunglasses assembly that is economical to manufacture and market.

It is a further object of the invention to provide a novel clip-on sunglasses assembly that has the top edge of the lens detachably secured to a unique spring action sled that can be reciprocally moved toward or away from the person wearing the hat when the lens is in its down position or its up position.

It is an additional object of the invention to provide a novel clip-on sunglasses assembly that is made of a minimum number of parts that can be quickly assembled or disassembled.

SUMMARY OF THE INVENTION

The clip-on sunglasses assembly has been primarily designed for use with a ball cap but it can also be used with any type of hat having a forwardly extending brim. The primary components of the assembly is a base member, a cover panel, a spring action sled, a lens holder member, a lens and a nose piece. The lens would preferably be made of optical grade thermoplastic material and the remaining structure, with the exception of the nose piece would be made of a rigid plastic material.

The base member has a substantially rectangular shape and a clip member is integrally formed with the base member and it extends rearwardly over its top surface. There is a substantially rectangularly shaped cutout portion within the base member that forms a track for the sled so that it can travel in a reciprocating back and forth motion. The spring action sled can travel along most of the length of the base member.

The spring action sled is inserted into the base member from its top surface and laterally extending flanges on the spring action sled prevent it from dropping through the cutout portion. There is a countersunk recess in the top surface of the base member that receives a cover panel that prevents the spring action sled from falling out of the base member in case it is turned upside down.

The spring action sled has a drum enclosure hook extending downwardly from its bottom surface adjacent its rear end and incorporating a lug to limit rotation of the holder inward toward the wearer's face. A spring finger extends downwardly from the bottom surface of the sled adjacent the front end. The spring finger extends toward the drum enclosure hook abruptly turning upward forming an elbow which traps the holder drum and it has an upwardly extending hook portion formed adjacent its rearward end. The hook elbow and the drum enclosure hook are spaced a predetermined distance apart for removably receiving a cylindrical shaped drum member that forms part of the structure of the lens holder. There are a pair of protrusions on the drum member and a mating recess on the hook portion that provides a detent positive structure for positioning the lens holder member in a substantially vertical or a substantially horizontal position.

The lens holder member has a pair of laterally spaced arms with studs extending up from them that pass through apertures in the lens and nose piece which are then secured in position by push nuts.

DESCRIPTION OF THE DRAWINGS

FIG. 1 is a front elevation view showing the clip-on sunglasses assembly secured to the brim of a ball cap with the lens flipped down into a position in front of the wearer's eyes;

FIG. 2 is a schematic side elevation view of the clip-on sunglasses assembly partly in cross section showing the lens, the holder and nose piece in its downward position;

FIG. 3 is a schematic side elevation view of the clip-on sunglasses assembly showing a portion in cross section with the lens, the holder and nose piece in its upper position;

FIG. 4 is a top plan view of the base member;

FIG. 5 is a cross sectional view taken along lines 5—5 of FIG. 4;

FIG. 6 is a bottom plan view of the clip member of the base frame;

FIG. 7 is a top plan view of the cover panel;

FIG. 8 is a cross sectional view taken along lines 8—8 of FIG. 7;

FIGS. 14–17 are schematic side elevation views showing the progression from the insertion of the drum of the lens holder member into the drum enclosure hook elbow of the spring action sled and the hook portion of the spring finger of the sled;

DESCRIPTION OF THE PREFERRED EMBODIMENT

Figure 9:
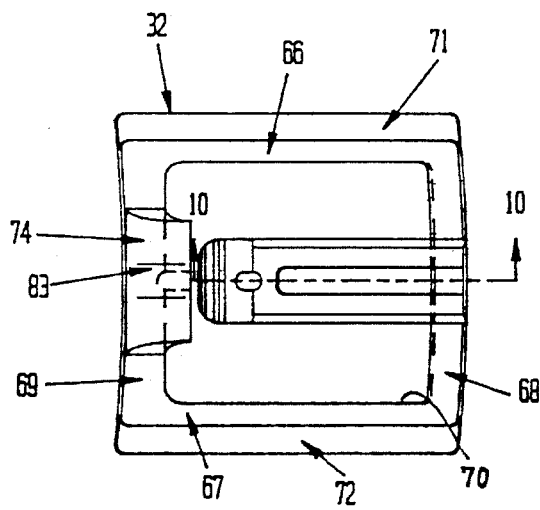
FIG. 9 is a bottom plan view of the spring action sled.

The novel clip-on sunglasses assembly will now be described by referring to FIGS. 1–19 of the drawings. The clip-on sunglasses assembly is generally designated numeral 20. In FIG. 1 the clip-on sunglasses assembly 20 is shown mounted on the brim 22 of a ball cap 24. Lens 26 is shown in its down position and it has a nose piece 25.

FIGS. 2 and 3 show the clip-on sunglasses assembly 20 by itself with certain portions shown in cross section. Base frame member 28 has an integrally formed spring clip member 30. Sled 32 is reciprocally mounted in rectangularly shaped cutout portion 33 of base member 28. Lens holder member 35 has a cylindrical shaped drum 36 that is pivotally mounted in the bottom of the spring action sled 32. A pair of laterally spaced studs 38 are formed on the rear surface of lens holder 35 and they pass through apertures 39 in lens 26 nose piece 25 and are secured therein by push nuts 40. Cover panel 42 prevents the removal of spring action sled 32 from base member 28. In FIG. 3 lens 26 is shown in its upward position.

The specific structure of base frame member 28 is best illustrated in FIGS. 4–6. Base member 28 has a pair of laterally spaced frame members 45 and 46 whose opposite ends are connected together by front cross member 47 and rear cross member 48. Cutout portion 33 is substantially rectangularly shaped and has a length L1 and a width W1. Shoulders 50 and 51 are formed on the respective longitudinal frame members 45 and 46 and provide a surface for the laterally extending flanges 71 and 72 of the spring action sled to ride upon. Laterally spaced outer members 93 and 94 engage the end of the holder drum 36 limiting the lateral movement of the holder 35 and its attachments. Cutout portion 33 and longitudinal frame members 45 and 46 form a track for the sled 32 to travel along the available length of the base frame member 28. A countersunk recess 54 is formed in the top surface of base member 28 for removably receiving cover panel 42. Spring clip 30 is integrally formed with base member 28. The bottom surface of spring clip 30 has a plurality of ridges 56 that function to grip the top surface of the brim of a cap to which the clip-on sunglasses assembly has been positioned.

Cover panel 42 is shown separately in FIGS. 7 and 8. It has a textured surface 58 with ridges 60 that function to grip the bottom surface of the brim 22 of a ball cap or hat 24. The rear end of cover panel 42 has a latch finger 62 that engages cooperating structure in slot 64 of base member 28.

Figure 10:
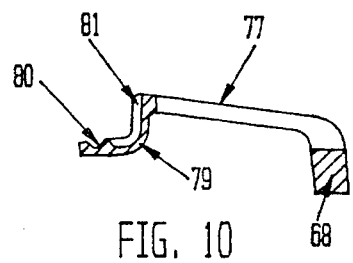
FIG. 10 is a cross sectional view taken along lines 10—10 of FIG. 9.
Figure 11:
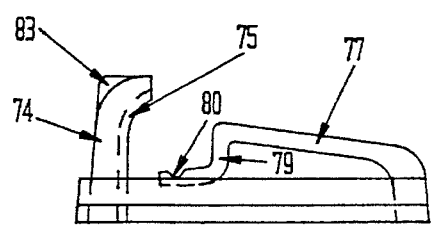
FIG. 11 is a side elevation view of the spring action sled.

The spring action sled 32 is best illustrated in FIGS. 9–11. It has a pair of laterally spaced longitudinally extending members 66 and 67 whose opposite ends are connected by front cross member 68 and rear cross member 69 to form a central opening 70. Flanges 71 and 72 extend from the respective longitudinal members 66 and 67. A drum enclosure hook portion 74 extends upwardly from rear cross member 69 and it has a groove 75 formed in its front surface. A lug 83 positioned at bottom of hook 74 limits rotation of holder member 35 and its attachments. A spring finger 77 extends upwardly and rearwardly from front cross member 68. It has a mating hook portion 79 on its front end having a detent 80 and a groove 81 in its front surface.

Figure 12:
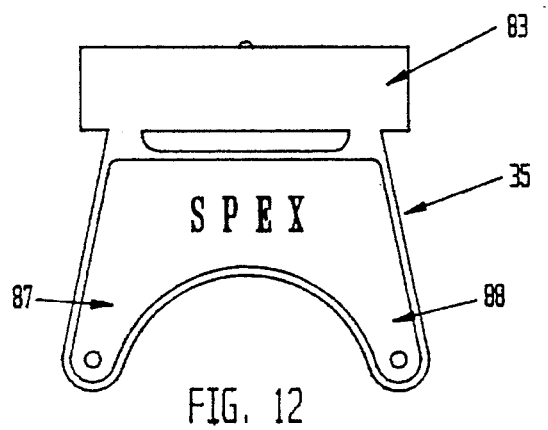
FIG. 12 is a top plan view of the lens holder member.
Figure 13:
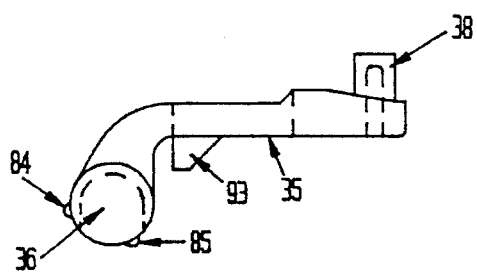
FIG. 13 is a side elevation view of the lens holder member.

Lens holder 35 is individually illustrated in FIGS. 12 and 13. It has a cylindrically shaped drum 36 having protrusions 84 and 85 spaced from each other approximately 110 degrees. Laterally spaced arms 87 and 88 have studs 38 extending up from their top surface which mate with apertures 39 in lens 26 and apertures in nose piece 25. The manner in which drum 83 is captured between drum enclosure hook 74 and hook portion 79 is best illustrated in FIGS. 14–17. These Figures also show how the protrusions 84 and 85 are positively captured in detent 80 to provide both a down position and an up position for lens 26 and nose piece 25. Lug member 93 extending downward from holder abuts lug member 83 of sled 32 when lens is in lowered position. This lug 93 and lug 83 positively limit rotation of holder and its attachments beyond the usable position, limiting possibility of rotating lens into the wearer's face.

Figure 18:
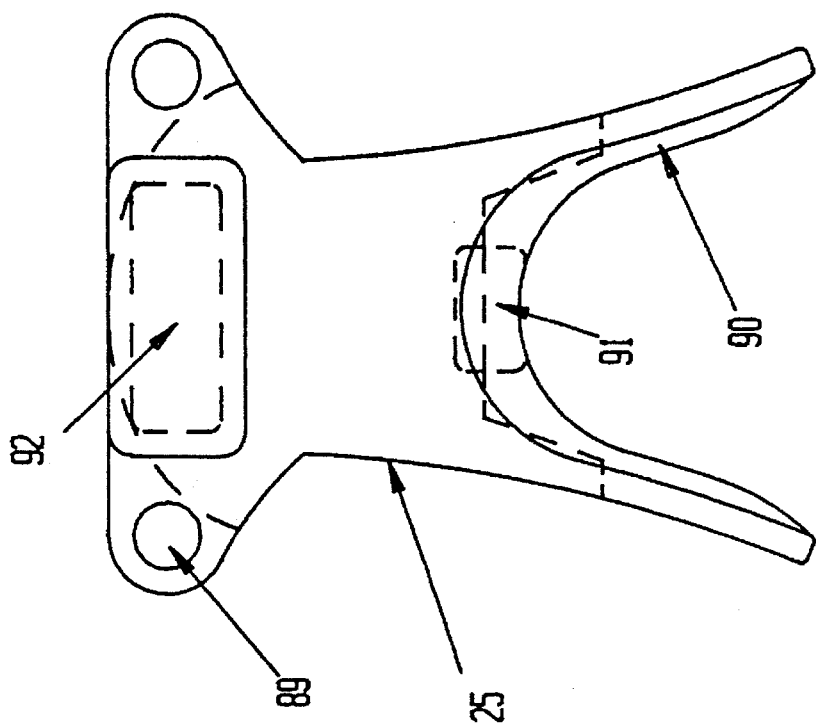
FIG. 18 shows a rear elevation of the nose piece.
Figure 19:
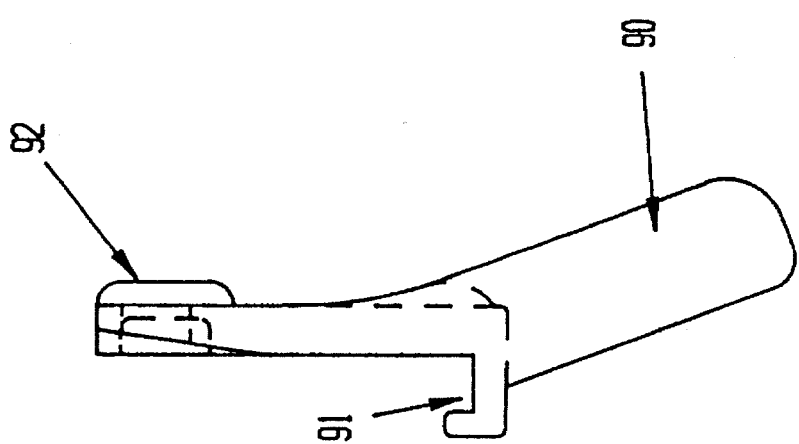
FIG. 19 shows a side elevation of the nose piece.

Now piece 25 is illustrated in FIGS. 18 and 19. The nose piece 25 is fixed to the lens holder 35 and lens 37. Holder lugs 38 pass through lens apertures 39 and nose piece aperture 89 and are fixed by push nuts 40. Nose piece 25 is made from a soft resilient plastic such as polyethylene. Nose pads 90 position the lens assembly 20 to the wearers bridge of nose. The nose piece hook 91 locks nose piece 25 to lens 26. Bridge pad 92 positions the lens assembly 20 from the wearer's forehead.

What is claimed is:

1. A clip-on sunglasses assembly for the brim of a hat comprising:

an elongated base member having a front end, a rear end, a left edge, a right edge, a top surface, a bottom surface and a longitudinal axis;

clip means secured to the top of said base member for detachably securing said base member to the bottom surface of the brim of a hat;

a spring action sled having a front edge, a rear edge, a left edge, a right edge, a top surface, a bottom surface and a longitudinal axis; said spring action sled having a pair of laterally spaced longitudinally extending members whose opposite ends are connected by a front cross member and a rear cross member that forms a central opening; said spring action sled having a drum enclosure hook portion extending downwardly from the bottom surface of said rear cross member and it extends forwardly below said central opening, said drum enclosure hook portion having a front surface; an elongated depressible spring finger having a front end and a rear end, the front end of said elongated spring finger is connected to the bottom surface of said front cross member and it extends downwardly and rearwardly below said central opening toward said drum enclosure hook portion and it has an upwardly and rearwardly extending mating hook portion adjacent its rear end, said mating hook portion having a rear surface, said mating hook portion and said drum enclosure hook portion being spaced a predetermined distance apart and when said elongated depressible spring finger is depressed upwardly into the central opening of said spring action sled the cylindrical shaped drum of a lens holder member can be inserted between or removed from between said mating hook portion and said drum enclosure hook portion.

means for reciprocally sliding said spring action sled back and forth along the bottom of said base member along its longitudinal axis;

a lens having a top edge, a bottom edge, a left edge, a right edge, a front surface, and a rear surface; and means for pivotally securing said lens to said spring action sled so that said lens can be pivoted from a first position having the rear surface of the lens in front of the eyes of a person wearing a hat to a second position having the front surface of the lens directed upwardly, said means for pivotally securing said lens to said spring action sled comprising a lens holder member having a front end and a rear end, the front end of said lens holder member being secured to said lens adjacent its top edge, the rear end of said lens holder member being connected to the lateral surface of said cylindrical shaped drum, said cylindrical shaped drum being removably received between said mating hook portion and said drum enclosure hook portion.

2. A clip-on sunglasses assembly for the brim of a hat as recited in claim 1 wherein said clip means and said base member are integrally formed as a single member.

3. A clip-on sunglasses assembly for the brim of a hat as recited in claim 1 wherein said means for reciprocally sliding said spring action sled back and forth comprises a track formed in said base member.

4. A clip-on sunglasses assembly for the brim of a hat as recited in claim 3 wherein said track is formed by a rectangularly shaped cutout portion having a predetermined length L1 and a predetermined width W1, said cutout portion extending completely through said base member from its bottom surface to its top surface.

5. A clip-on sunglasses assembly for the brim of a hat as recited in claim 4 wherein said spring action sled travels in said cutout portion and it has a flange extending from its right edge and its left edge that prevents said spring action sled from falling out of the cutout portion.

6. A clip-on sunglasses assembly for the brim of a hat as recited in claim 5 wherein said base member has a countersunk recess in its top surface that surrounds said cutout portion, a cover panel is detachably received in said countersunk recess to cover the top surface of said spring action sled and prevent its accidental removal.

7. A clip-on sunglasses assembly for the brim of a hat as recited in claim 1 wherein the bottom edge of said lens has a cutout portion formed intermediate its length for detachably receiving a nose piece.

8. A clip-on sunglasses assembly for the brim of a hat as recited in claim 1 wherein said base member is formed by a pair of longitudinally extending frame members that are connected together by a front cross member and a rear cross member that form a cutout portion between them for removably receiving said spring action sled.

9. A clip-on sunglasses assembly for the brim of a hat as recited in claim 1 further comprising means for positively positioning said lens holder member in a substantially vertical position and a substantially horizontal position, said means for positioning being a longitudinally extending groove in the rear surface of said mating hook portion and a longitudinally extending groove in the front surface of said drum enclosure hook portion, the cylindrical shaped drum of said lens holder member having a pair of circumferentially spaced protrusions that mate with the respective grooves in said mating hook portion and said drum enclosure hook portion.

10. A clip-on sunglasses assembly for the brim of a hat as recited in claim 1 further comprising an elongated cover panel removably secured to the top surface of said elongated base member for preventing said spring action sled from popping out of the top surface of said elongated base member when said lens holder member is removed for cleaning said lens.

* * * * *